United States Patent
Huth et al.

(10) Patent No.: US 9,713,814 B2
(45) Date of Patent: Jul. 25, 2017

(54) SWITCHABLE SLOT VALVE FOR A COATING SYSTEM, COATING SYSTEM, AND COATING METHOD

(71) Applicant: VOLKSWAGEN VARTA Microbattery Forschungsgesellschaft mbH & Co. KG, Ellwangen, Jagst (DE)

(72) Inventors: Andreas Huth, Ellwangen (DE); Robert Sekler, Ellwangen (DE)

(73) Assignee: VW-VM Forschungsgesellschaft mbH & Co. KG (DE)

( * ) Notice: Subject to any disclaimer, the term of this patent is extended or adjusted under 35 U.S.C. 154(b) by 148 days.

(21) Appl. No.: 14/430,356

(22) PCT Filed: Jul. 8, 2013

(86) PCT No.: PCT/EP2013/064389
§ 371 (c)(1),
(2) Date: Mar. 23, 2015

(87) PCT Pub. No.: WO2014/048598
PCT Pub. Date: Apr. 3, 2014

(65) Prior Publication Data
US 2015/0246366 A1     Sep. 3, 2015

(30) Foreign Application Priority Data

Sep. 27, 2012   (DE) ........................ 10 2012 217 683

(51) Int. Cl.
*B05B 1/32* (2006.01)
*B05C 5/02* (2006.01)
(Continued)

(52) U.S. Cl.
CPC ................ *B05B 1/32* (2013.01); *B05B 1/044* (2013.01); *B05C 5/0233* (2013.01);
(Continued)

(58) Field of Classification Search
CPC combination set(s) only.
See application file for complete search history.

(56) References Cited

U.S. PATENT DOCUMENTS 3,098,506 A   7/1963 Spragens
3,788,355 A   1/1974 Wood
(Continued)

FOREIGN PATENT DOCUMENTS

DE   21 52 070   4/1972
DE   23 46 825   3/1975
(Continued)

OTHER PUBLICATIONS

Notice of Reason for Rejection in English dated Feb. 9, 2017, from corresponding Japanese Application No. 2015-533485.

*Primary Examiner* — Austin Murata
(74) *Attorney, Agent, or Firm* — DLA Piper LLP (US)

(57) ABSTRACT

A switchable slot valve for a coating plant controls delivery of a pasty coating material. The switchable slot valve has a valve bore incorporated in a valve main body and is aligned in a valve extent direction, and a valve control rod is rotatable to switch between a throughput position and a closed position and is mounted in the valve bore by bearing faces is disposed. To mitigate disruptions by coating material which has made its way into a bearing gap between the valve bore and the bearing faces, depression regions are provided in the region of which the respective outer circumferential part-face does not bear on the inner circumferential face of the valve bore, on the outer circumferential part-faces between the slot-shaped duct inlet and the slot-shaped duct outlet.

10 Claims, 2 Drawing Sheets

(51) Int. Cl.
  *H01M 4/04* (2006.01)
  *B05B 1/04* (2006.01)
  *B05D 1/26* (2006.01)
  *F16K 5/04* (2006.01)
  *F16K 5/08* (2006.01)
  *H01M 4/88* (2006.01)

(52) U.S. Cl.
  CPC ............ *B05C 5/0258* (2013.01); *B05D 1/265* (2013.01); *F16K 5/04* (2013.01); *F16K 5/08* (2013.01); *H01M 4/0404* (2013.01); *H01M 4/0411* (2013.01); *H01M 4/8825* (2013.01); *H01M 4/8864* (2013.01)

(56) References Cited

U.S. PATENT DOCUMENTS

| | | | |
|---|---|---|---|
| 4,461,236 A | | 7/1984 | Langenbach |
| 4,756,271 A | | 7/1988 | Maier |
| 6,174,372 B1 | * | 1/2001 | Yoshinaga ............ B05C 5/0258 118/674 |
| 2004/0261696 A1 | | 12/2004 | Ackerman |
| 2010/0177138 A1 | * | 7/2010 | Ikushima .............. B05C 5/0025 347/19 |

FOREIGN PATENT DOCUMENTS

| | | |
|---|---|---|
| DE | 31 48 037 | 6/1983 |
| DE | 10 2010 017 965 | 10/2011 |
| JP | 4-27464 | 1/1992 |

* cited by examiner

SWITCHABLE SLOT VALVE FOR A COATING SYSTEM, COATING SYSTEM, AND COATING METHOD

TECHNICAL FIELD

This disclosure relates to a switchable outlet valve for a coating plant to control delivery of a pasty coating material. The disclosure also relates to a coating plant having a switchable slot valve and a method of coating surfaces.

BACKGROUND

Generic switchable slot valves for coating plants are known. Valves of this type display a valve bore, aligned in a valve extent direction, which is in a valve main body and into which a supply duct opens and from which a nozzle duct leads out to connect to a slot nozzle of the coating plant. Disposed in the valve bore of a known slot valve is a valve control rod mounted in the valve bore to be rotatable about a rotation axis which extends in the valve extent direction and is penetrated by a valve duct which disposes of a duct inlet extending axially along an outer side of the valve control rod and a suchlike opposite duct outlet, the former and latter being interconnected by a valve duct which penetrates the valve control rod.

In those known slot valves, the valve control rod can be rotated between a throughput position and a closed position by a motor. In the throughput position, the valve control rod is disposed such that the coating material supplied through the supply duct can make its way through the duct inlet into the valve duct and from there through the duct outlet into the nozzle duct, from where it is supplied according to the intended use to the slot nozzle of the coating plant. In contrast, in the closed position, the nozzle duct is isolated from the supply duct by the valve control rod such that the deployment of coating material is interrupted.

Bearing faces which, for the purpose of bearing the valve control rod, bear on the circumferential face of the valve bore are provided on the valve control rod in the region of two outer circumferential part-faces between the slot-shaped duct inlet and the slot-shaped duct outlet. Since the valve control rod is rotatable, there remains in the bearing region a bearing gap of at most 100 µm between these bearing faces and the inner circumferential face of the valve bore.

Generic slot valves control in a targeted manner delivery of the coating material through a slot nozzle. For this purpose, they are upstream of the slot nozzle and by rotation of the valve control rod enable temporary interruption of the supply of the coating material to the slot nozzle. This is particularly used to deliver coating material through the slot nozzle and interrupt delivery in an alternating manner.

Generic coating plants having generic slot valves are used in the manufacture of batteries, in particular. In this context, they deploy a pasty coating material which, in particular, contains electrochemically active particles such as graphite particles, for example, in the form of a thin layer. In particular, the layer may be applied as an electrode layer immediately onto a suitable collector of the battery. However, a coating is also understood to be the temporary application onto a carrier substrate such as a roller or a planar carrier substrate, for example, from which according to the intended use the layer formed by the coating material is removed again in later production steps, for example, for application onto a collector strip.

Apart from deployment of a coating material having electrochemically effective particles for the manufacture of a battery, coating plants of that type may also be used to manufacture an electro-catalytic layer of a fuel cell. In that case, in particular coating materials which contain catalyst particles (precious metals, Raney nickel, tungsten carbide, molybdenum sulfides, tungsten sulfides, or similar suitable materials) as electrochemically active particles and which may catalyze the cold combustion of fuels such as hydrogen or methanol may be processed.

In generic coating plants, a paste reservoir from which the coating material is supplied to the slot valve and the downstream slot nozzle is usually located upstream of the slot nozzle. Both designs in which the paste reservoir per se is impinged with pressure to press the coating material in the direction of the slot valve as well as designs in which a separate motor-driven conveying means such as a pump, for example, connects between the paste reservoir and the slot valve are conceivable.

A slot valve is understood as a valve in which the supply duct, the nozzle duct, and the valve duct penetrating the valve control rod, in a dimension transverse in relation to the conveying direction, display a considerably larger extent than in the dimension which extends thereto in an orthogonal manner and is likewise transverse in relation to the conveying direction. The extent of the respective ducts in the valve extent direction according to the definition of a slot valve is at least larger by a factor of 4 than the extent transverse to the valve extent direction. With respect to the valve control rod it displays a length in the valve extent direction, along which the valve control rod is penetrated by the valve duct, that is at least four times the mean radius of the valve control rod. Preferably and most commonly, the length of the valve control rod, along which it is penetrated by the valve duct, is larger than the radius of the valve control rod by a greater factor, preferably by at least a factor of 10.

The mentioned correlation between the radius and diameter of the valve control rod, on the one hand, and its length, on the other hand, in practice leads to difficulties. It has emerged, for example, that coating material which makes its way into the narrow gap between the inner circumference of the valve bore and the outer circumferential part-faces of the valve control rod causes the momenta required to readjust the slot valve to surge as the period of operation increases.

This is caused by the tendency of many coating materials and in particular coating materials used in the context of the manufacture of batteries toward increasing their viscosity at a high shear load. The longer remnants of the coating material remain between the inner circumferential face of the valve bore and the outer circumferential part-faces and the narrower the gap between the inner circumferential face and the outer circumferential part-faces, the greater the viscosity of the coating material. In practice, the electrical actuators provided on generic slot valves to switch the slot valve can no longer effect a reliable valve switching operation after a certain operating period such that use of the coating plant has to be interrupted and the valve bore has to be cleaned.

It could therefore be helpful to provide a switchable slot valve of the generic type such that the slot valve functions in a maintenance-free manner over a comparatively long period of time.

SUMMARY

We provide a switchable slot valve for a coating plant that controls delivery of a pasty coating material including a valve bore incorporated in a valve main body and aligned in a valve extent direction, a supply duct disposed in a region of an inner circumferential face of the valve bore and opens into the valve bore, a nozzle duct disposed in the region of the inner circumferential face of the valve bore and leads out of the valve bore, and a valve control rod disposed in the valve bore is mounted to be rotatable in the valve bore about a rotation axis extending in a valve extent direction, and is penetrated by a valve duct having a slot-shaped duct inlet and a slot-shaped duct outlet, wherein the valve control rod in the valve bore is rotatable between a throughput position and a closed position, wherein, in the throughput position, the supply duct and the nozzle duct interconnect to communicate via the valve duct, and wherein, in the closed position, the nozzle duct is isolated from the supply duct by the valve control rod, bearing faces which, for bearing the valve control rod, bear on the inner circumferential face of the valve bore are provided on the valve control rod in the region of two outer circumferential part-faces between the slot-shaped duct inlet and the slot-shaped duct outlet, and depression regions in a region of which the respective outer circumferential part-face does not bear on the inner circumferential face of the valve bore are provided on the outer circumferential part-faces.

We further provide a coating plant that coats surfaces with a pasty coating material in a continuous method, including a supply unit that supplies the coating material by a supply duct, a switchable slot valve located downstream of the supply duct, a nozzle duct located downstream of the slot valve, and a slot nozzle located downstream of the nozzle duct that deploys the coating material onto the surface to be coated therewith.

We yet further provide a method of deploying a coating material on a surface including deploying the coating material by the coating plant.

DETAILED DESCRIPTION

Figure 1:
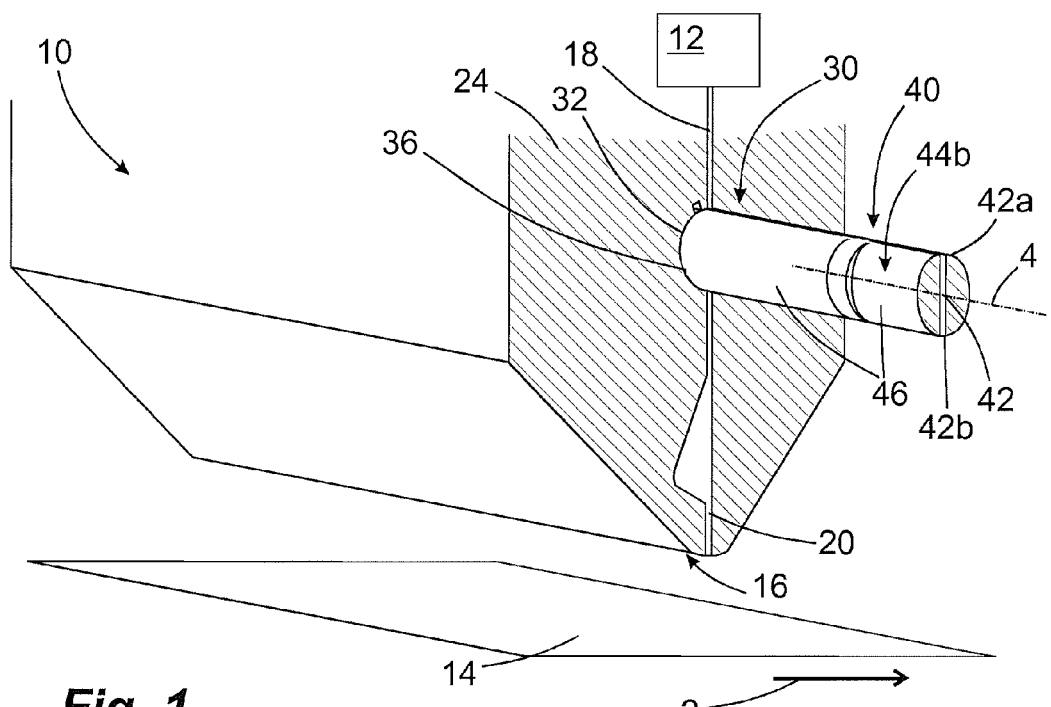
FIG. 1 shows a coating plant.

We provide slot valves with depression regions, in the region of which the respective outer circumferential part-face does not bear on the inner circumferential face of the valve bore, on the outer circumferential part-faces. The spacing between the bottom of the depression region and the inner circumferential face of the valve bore is at least 0.5 mm.

Our slot valves have the above-described features of generic slot valves. The valve main body per se preferably is a metallic main body into which the valve bore is incorporated using, in particular, metal-cutting machining. The valve bore per se is a rotationally symmetrical and preferably cylindrical clearance, the length of which is at least four times the mean radius. The valve bore does not inevitably have to have a cylindrical shape, but may also be conical, for example. The supply duct opens into the valve bore and the nozzle duct leads off from the valve bore, wherein both ducts connect to the valve bore by slot-type openings primarily extending in the valve extent direction. The absolute length of the valve bore and the substantially identical width of the supply duct and of the nozzle duct in the region of the circumferential face of the valve bore and the valve duct are at least 30 mm, preferably at least 100 mm. Depending on the purpose of the application, the length of the bore, or the width of the respective ducts, respectively, may be up to 2000 mm and more. The mean diameter of the valve bore, in particular the diameter of the cylindrical valve bore, preferably is <30 mm. The width of the mouth of the supply duct and the exit into the nozzle duct is preferably at least four times the height of the mouth or of the exit, respectively.

The outer circumferential part-faces are the two part-faces extending in the circumferential direction and counter to the circumferential direction from the duct inlet to the duct outlet of the valve duct. The width of the outer circumferential part-faces corresponds to the maximum width of the valve duct in the valve extent direction.

While in known slot valves the two outer circumferential part-faces entirely lie on a collective imaginary cylindrical face and thus in each case in their entirety act as a bearing face, we provide at least one depression region, preferably a plurality of depression regions, in the region of the outer circumferential part-faces. While the bearing faces on the outer circumferential part-faces of the valve control rod are adapted to the valve bore such that they have a spacing of less than 100 μm in relation to their rotationally symmetrical inner circumferential face, the spacing is larger in the depression regions. A depression region is understood to be a region in which the spacing is at least 0.5 mm. Such a spacing is sufficient to significantly diminish the effect of increasing viscosity in the coating materials usually deployed using slot valves.

The outer circumferential part-faces of the valve control rod of a slot valve are thus sub-divided into bearing faces and depression regions. To ensure a particularly good measure of free movement of the valve control rod, we found that it is advantageous for the proportion of depression regions on the outer circumferential part-faces of the valve control rod to be at least 20%. Preferably, this proportion is even higher, in particular at least 50%, particularly preferably at least 80%.

The bearing faces and the depression regions may be distributed in many different ways. In principle, a specific arrangement of the bearing faces is not essential to achieve the advantageous effect.

However, we found that it is advantageous for at least one bearing ring portion which extends in the circumferential direction between the duct inlet and the duct outlet of the valve duct to be provided on the outer circumferential part-faces. It is particularly advantageous for at least two bearing ring portions which are spaced apart in the valve extent direction and in the axial direction collectively enclose a depression region disposed therebetween to be provided on the outer circumferential part-faces. The bearing ring portions on the first and on the second outer circumferential part-face preferably are disposed to be at the same height in relation to the valve extent direction such that they form an at least almost encircling bearing face. Such an almost encircling bearing face which may, however, optionally be interrupted by grooves associated with the depression regions, contributes toward high stability of the valve control rod in the valve bore.

It is of particular advantage for encircling bearing rings, the outer face of which forms an encircling bearing face, to be provided on the valve control rod, wherein the bearing rings span the duct inlet and the duct outlet. In such a design, an encircling bearing face which even in the region of the duct inlet and of the duct outlet is not interrupted and which instead itself interrupts the slot-shaped duct inlet and the slot-shaped duct outlet is thus provided. Such an encircling bearing face effectively reduces the amount of coating material which makes its way between the bearing face and the inner circumferential face of the valve bore in the region of this bearing face.

It is furthermore of advantage for the valve control rod to have at least two bearing webs on both sides of the inlet duct and/or on both sides of the outlet duct, which bearing webs extend to be parallel with the valve extent direction and are associated with the bearing face. In the closed position of the valve control rod, these bearing webs in collaboration with the inner circumferential face of the valve bore interrupt a path from the supply duct to the nozzle duct, bypassing the valve duct. These bearing webs preferably are provided to be immediately adjacent to the duct inlet and/or the duct outlet. A depression region extends, preferably in relation to the circumferential direction, between the bearing webs of the duct inlet and of the duct outlet.

By having the depression regions, the issue of a large-area and narrow bearing gap is indeed already considerably diminished such that the tendency of the valve control rod toward jamming is likewise considerably reduced. To additionally reduce the tendency toward jamming, it may nevertheless be of advantage for a receiving space that receives coating material to be received in the inner circumferential face of the valve bore. This receiving space preferably may extend across the entire length or almost the entire length (>80%) of the valve bore in the form of a groove aligned in the valve extent direction. However, a plurality of receiving spaces not immediately interconnected may also be provided. The receiving space, or the receiving spaces, respectively, allow(s) coating material which on account of its previously existing location in the bearing gap has been severely shear-stressed and thus has attained high viscosity to be received. It is of particular advantage for such a receiving space to be provided in the region of the already mentioned bearing rings.

For the manufacture of a valve control rod of a switchable slot valve, it is above all expedient for this valve control rod to be produced in an integral manner such that all bearing faces and the walls defining the valve duct are integrally interconnected. Proceeding from a cylindrical blank, it is particularly expedient to incorporate the slot-shaped valve duct and remove material from the outer side of the blank in particular by metal-cutting machining to create the depression regions by way thereof.

In alternative designs, however, it may also be provided for the encircling bearing rings to be configured as separate components which are placed, in particular heat-shrunk, onto a common component which defines the valve duct, or are linked to the common component in another form-fitting or frictionally fitting manner.

We also provide a coating plant for coating surfaces with a pasty coating material in a continuous method, wherein the coating plant comprises a supply unit that supplies the coating material by a supply duct, a switchable slot valve downstream of the supply duct, a nozzle duct downstream of the slot valve, and a slot nozzle downstream of the nozzle duct. The slot valve is configured in the manner described above. In such a coating plant, the supply unit preferably comprises a paste reservoir in which a coating material which is suitable for the manufacture of batteries is held ready, that is to say in particular a coating material having electrochemically active particles which may serve in the manufacture of a battery electrode.

We furthermore provide a method of coating a surface in which the described coating plant is used. This is preferably a method of delivering a coating material which forms a battery electrode.

Further aspects and advantages are derived, apart from the appended claims, from the following description of a preferred example of two variants thereof, which are explained by the figures.

FIG. 1 shows a coating plant 10. The coating plant serves the purpose of applying a coating material from a paste reservoir 12 onto a substrate 14 which during the coating process is continuously moved in the direction of the arrow 2. For this purpose, a slot-shaped nozzle 16 through which the coating material can be applied onto the substrate 14 in the form of a wide coating film is provided. A slot valve 30 which alternatingly enables and interrupts the supply of coating material to the slot nozzle 16 is provided between the paste reservoir 12 and the slot nozzle 16.

The slot valve 30 has a valve bore 32 incorporated in a main body 24 and is configured as a cylindrical bore. A supply duct 18 which supplies pressurized coating material from the paste reservoir 12 to the slot valve 30 opens into the bore. On the opposite side of the valve bore 32, the valve bore 32 connects by a slot-shaped exit to a nozzle duct 20 leading to the slot nozzle 16.

In the valve bore extending in the valve extent direction 4, a valve control rod 40 which is rotatable about a rotation axis 4 aligned in the valve extent direction 4 is employed. Depending on the rotational position of the valve control rod 40 within the valve bore 32, the supply of coating material to the slot nozzle 16 is enabled or interrupted, respectively.

Figure 3A:
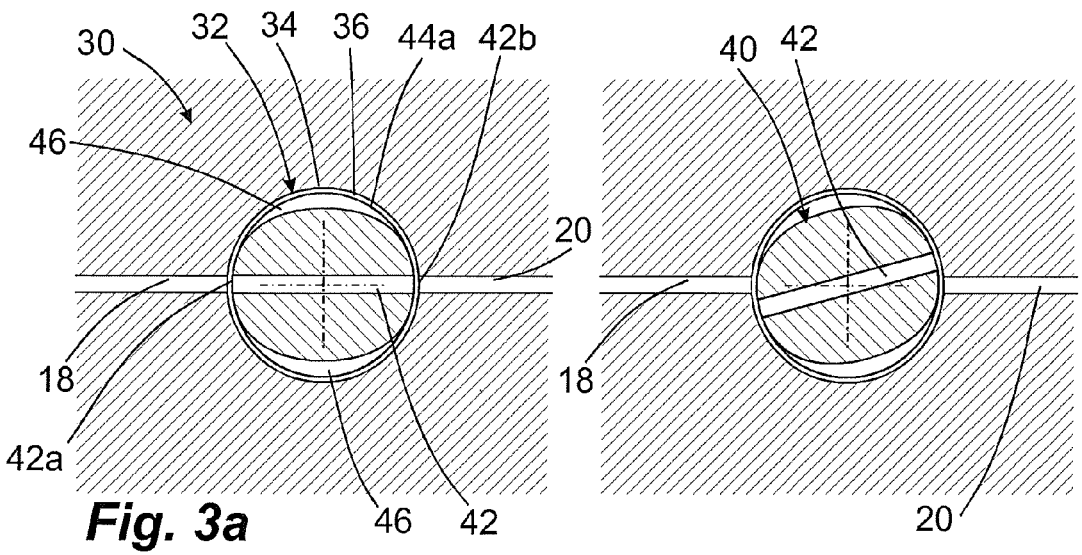
FIGS. 3a to 3c show a section through a slot valve using the example of FIGS. 1 and 2, and two alternatives thereto.

FIG. 3a on the right side shows the closed state. In the closed state, a valve duct 42 extending within the valve control rod 40 from a duct inlet 42a up to a duct outlet 42b is not in alignment with the supply duct 18 and the nozzle duct 20. Coating material supplied from the supply duct 18 thus cannot make its way into the nozzle duct 20. Delivery of the coating material is interrupted.

In the open position of FIG. 3a, left side, the valve duct 42, however, is in alignment with the supply duct 18 and the nozzle duct 20 such that delivery of coating material is possible.

We found as a disadvantage in known generic slot valves that it is practically impossible to prevent coating material making its way into the narrow bearing gap 36 between an inner circumferential face 34 of the valve bore 32 and a circular-cylindrical bearing face of the valve control rod. The coating material having made its way into the bearing gap is highly shear-stressed therein and, depending on the type of the material, may therefore be subject to a considerable increase in viscosity, which may lead to jamming of the valve control rod 40.

To bring this issue under control, we provide in the illustrated example in the case of the two bearing faces, that is to say those faces which extend in the clockwise and in the counter-clockwise direction from the duct inlet 42a to the duct outlet 42b, depressions 46 which lead to a considerable reduction in the shear load of the coating material.

Figure 2:
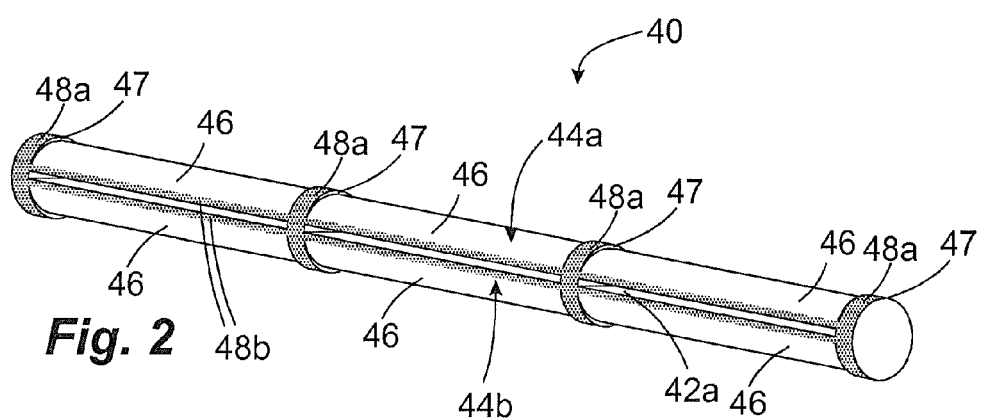
FIG. 2 shows the valve control rod of a coating plant according to FIG. 1.

FIG. 2 shows the valve control rod 40. The valve duct 42, which is repeatedly interrupted for the purpose of increasing torsional rigidity, and its duct inlet 42a can be seen. The duct outlet 42b is provided on the opposite side thereto and cannot be identified in the illustration of FIG. 2. The outer faces 44a, 44b of the valve control rod extending in the clockwise and counter-clockwise direction, respectively, from the duct inlet 42a to the duct outlet 42b, are referred to as outer circumferential part-faces 44a, 44b. As can be readily derived from FIG. 2, the outer circumferential partfaces 44a, 44b are provided with depression regions 46, that is to say with regions in which the outer circumferential part-faces 44a, 44b are recessed in relation to a shape having a circular-cylindrical cross section. The bearing faces 48a, 48b, adapted to the valve bore 32, are identified with dashed markings in FIG. 2. They include encircling bearing faces 48a and bearing webs 48b adjacent to the duct inlet or duct outlet, respectively. The depression regions 46 are isolated in relation to the duct inlet 42a and the duct outlet 42b, respectively, by such bearing faces 48a in the region of bearing rings 47 and bearing webs 48b.

On account of the described design in which more than 90% of the outer circumferential part-faces 44a, 44b display larger spacing in relation to the inner circumferential face 34 of the valve bore 32, a considerably diminished tendency toward stiff movement on the control rod 40 is caused. Those regions of the bearing gap 36 in which remnants of coating material may cause stiff movement are considerably reduced and limited to the bearing faces 48a on the bearing rings 47 and bearing webs 48b. With respect to the bearing rings 47 it is furthermore advantageous that the bearing faces 48a thereof are closed in an encircling manner and even in the region of the duct inlet 42a and the duct outlet 42b span the two latter. There is thus a reduced level of ingress of coating material which could increase stiff movement in the region of the bearing faces 48a. In turn, the bearing webs 48b are sufficiently narrow to effectively prevent the same coating material being repeatedly shear-stressed in the region of the bearing webs 48b and, on account thereof, becoming highly viscous. Instead, in the event of each positioning movement of the valve control rod 40 the coating material previously present between the inner circumferential face 34 of the valve bore 32 and the bearing webs 48b is pressed either into the flow path formed by the supply duct, the valve duct 42, and the nozzle duct 20, or else pressed in the region of one of the depressions 46.

The illustrated and described switchable slot valve 30 is thus readily usable to maintain an enduring operation of the coating plant equipped therewith.

As already mentioned, FIG. 3a shows a cross section through the slot valve 30 shown in FIGS. 1 and 2, in the closed position (on the right) and in the throughput position (on the left). The depressions 46 considerably enlarge the bearing gap 36 and thus effectively counteract shearing of the coating material disposed in the depression regions 46. It can also be derived from FIG. 3a that the outer contour of the cross-sectional area in the region of the depression regions 46 is somewhat elliptic, that is to say it continuously tapers off from the maximum radius in the region of the duct inlet 42a and of the duct outlet 42b toward the minimum. In terms of production technology, this can be implemented particularly advantageously.

Figure 3B:
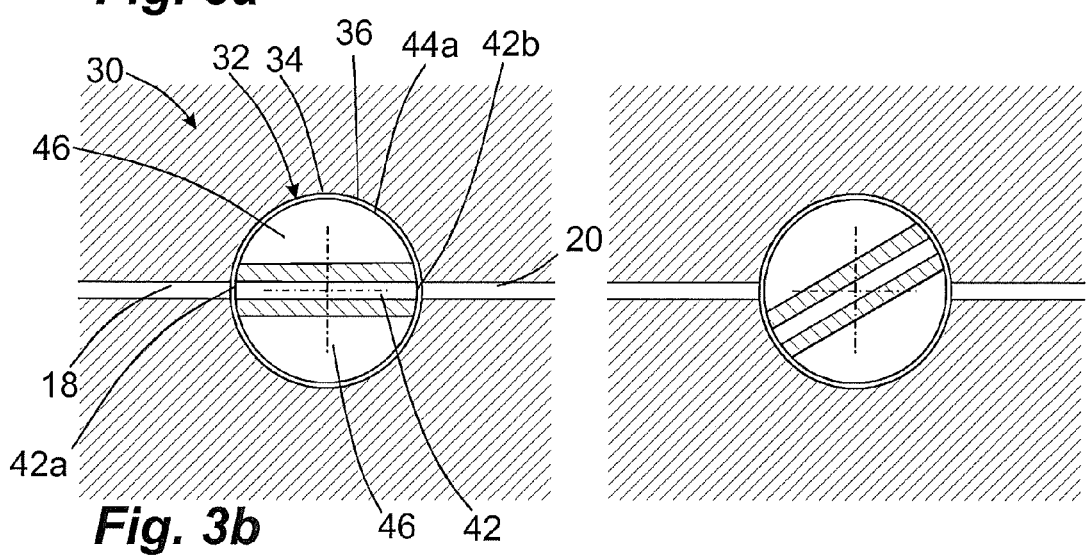

Corresponding to the variant of FIG. 3b, it is also possible to considerably enlarge the depressions 46 yet again such that merely walls remain on both sides of the valve duct 42. On account thereof, however, the torsional rigidity of the valve control rod 40 is weakened such that such a design is only expedient if the materials used or a comparatively short length of the control valve in the valve extent direction 4 still allows for a sufficiently torsion-free positioning operation of the valve control rod 40.

Figure 3C:
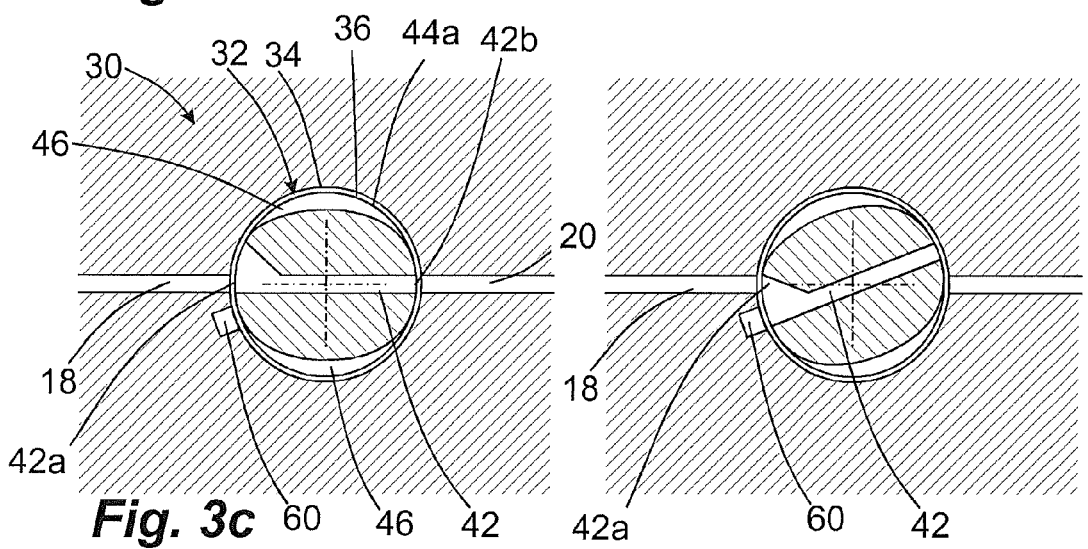

In the design according to FIG. 3c the following special feature is provided: a receiving space 60 is provided on the inner circumferential face 34 of the valve bore 32 to be offset in relation to the supply duct 18. This receiving space preferably extends across the entire width of the supply duct 18, of the valve duct 42, and/or of the nozzle duct 20. The receiving space serves the purpose of receiving coating material which has made its way particularly in the region of the annular bearing faces 48a, between those and the inner circumferential face 34 of the valve bore 32. As soon as the closed position of the valve 30, which is illustrated on the right side in FIG. 3c prevails, this receiving space 60 collaboratively connects by way of the widened duct inlet 42a to the supply duct 18 and the valve duct 42 and, on account thereof, is flushed. On account thereof, material which has previously been particularly heavily shear-stressed is flushed into the valve duct 42 and, once the slot valve 30 has been opened again, pressed into the nozzle duct 20.

The invention claimed is:

1. A switchable slot valve for a coating plant that controls delivery of a pasty coating material comprising:
    a valve bore incorporated in a valve main body and aligned in a valve extent direction,
    a supply duct disposed in a region of an inner circumferential face of the valve bore and opens into the valve bore,
    a nozzle duct disposed in the region of the inner circumferential face of the valve bore and leads out of the valve bore, and
    a valve control rod disposed in the valve bore is mounted to be rotatable in the valve bore about a rotation axis extending in a valve extent direction, and is penetrated by a valve duct having a slot-shaped duct inlet and a slot-shaped duct outlet,
wherein:
    the valve control rod in the valve bore is rotatable between a throughput position and a closed position, wherein, in the throughput position, the supply duct and the nozzle duct interconnect to communicate via the valve duct, and wherein, in the closed position, the nozzle duct is isolated from the supply duct by the valve control rod,
    bearing faces which, for bearing the valve control rod, bear on the inner circumferential face of the valve bore are provided on the valve control rod in the region of two outer circumferential part-faces between the slot-shaped duct inlet and the slot-shaped duct outlet,
    depression regions in a region of which the respective outer circumferential part-face does not bear on the inner circumferential face of the valve bore are provided on the outer circumferential part-faces,
    at least two bearing ring portions extending in a circumferential direction between the duct inlet and the duct outlet and which are mutually interrupted by a depression region are provided on the outer circumferential part-faces, and
    encircling bearing rings, outer faces of which form an encircling bearing face, are provided, and the bearing rings span the duct inlet and the duct outlet.

2. The switchable slot valve as claimed in claim 1, wherein the depression regions on the outer circumferential part-faces of the valve control rod form at least 20% of an area of the total outer circumferential part-faces.

3. The switchable slot valve as claimed in claim 1, wherein the control rod has at least two bearing webs on both sides of the inlet duct and/or on both sides of the outlet duct, which bearing webs extend to be parallel with the valve extent direction and which in the closed position of the valve control rod in collaboration with the inner circumferential face of the valve bore interrupt a path from the supply duct to the nozzle duct, bypassing the valve duct.

4. The switchable slot valve as claimed in claim 1, wherein, to receive coating material which has made its way between the bearing faces and the inner circumferential face of the valve bore, at least one receiving space is incorporated in the inner circumferential face of the valve bore.

5. The switchable slot valve as claimed in claim 1, wherein all bearing faces of the valve control rod and walls defining the valve duct are configured to be integral with one another.

6. A coating plant that coats surfaces with a pasty coating material in a continuous method, comprising:
   a supply unit that supplies the coating material by a supply duct,
   the switchable slot valve as claimed in claim 1 and located downstream of the supply duct,
   a nozzle duct located downstream of the slot valve, and
   a slot nozzle located downstream of the nozzle duct, that deploys the coating material onto the surface to be coated therewith.

7. The coating plant as claimed in claim 6, wherein the supply unit comprises a paste reservoir containing a coating material for the manufacture of batteries.

8. The switchable slot valve as claimed in claim 2, wherein the control rod has at least two bearing webs on both sides of the inlet duct and/or on both sides of the outlet duct, which bearing webs extend to be parallel with the valve extent direction and which in the closed position of the valve control rod in collaboration with the inner circumferential face of the valve bore interrupt a path from the supply duct to the nozzle duct, bypassing the valve duct.

9. The switchable slot valve as claimed in claim 2, wherein, to receive coating material which has made its way between the bearing faces and the inner circumferential face of the valve bore, at least one receiving space is incorporated in the inner circumferential face of the valve bore.

10. The switchable slot valve as claimed in claim 3, wherein, to receive coating material which has made its way between the bearing faces and the inner circumferential face of the valve bore, at least one receiving space is incorporated in the inner circumferential face of the valve bore.

\* \* \* \* \*